April 8, 1941.  G. H. BROWN  2,237,697

PIE PLATE OR THE LIKE

Filed March 9, 1940

Inventor
GEORGE H. BROWN

By
Attorney

Patented Apr. 8, 1941

2,237,697

UNITED STATES PATENT OFFICE 2,237,697

PIE PLATE OR THE LIKE

George H. Brown, Highland Park, Ill.

Application March 9, 1940, Serial No. 323,133

7 Claims. (Cl. 53—6)

This invention relates to improvements in pie plates or other dishes intended to be used primarily for baking purposes.

The conventional pie plate is unsatisfactory because in the use thereof in baking overflow and loss of part of the fruit, vegetable or other fillings, or even of the crust-forming dough occurs. Attempts have been made to obviate this disadvantage and objection by the provision of attachments designed to confine the filling and dough to the pie plate thereby to prevent the same from overflowing. These attachments, however, are unsatisfactory and besides failing to serve the purpose of entirely preventing leakage or loss of filling or dough from the pie plate are in themselves objectionable because, among other things, the filling or dough passes into and gets caught in the spaces between the pie plate and the attachment thereby making it difficult to remove the baked pie without breaking parts of the crust rim and thereby impairing and detracting from the appearance of the pie. These disadvantages and objections are obviated in accordance with the present invention and pursuant to the main object thereof.

It is also an object of the invention to provide a pie plate of improved construction designed to prevent the overflow of the pie filling or dough and to accomplish this in such manner as to improve the appearance of the pie.

A further object of the invention is the provision of a pie plate constructed and arranged to prevent the overflow of the pie filling or dough and to facilitate the removal of the pie from the plate.

A yet further object of the invention is generally to improve the construction of pie plates and to make unnecessary the use of separate devices for preventing the overflow of the filling or dough of the pie.

The above objects of the invention and other objects which might hereinafter appear will be fully understood from the following description, reference being had to the accompanying illustrated drawing.

Figure 1:
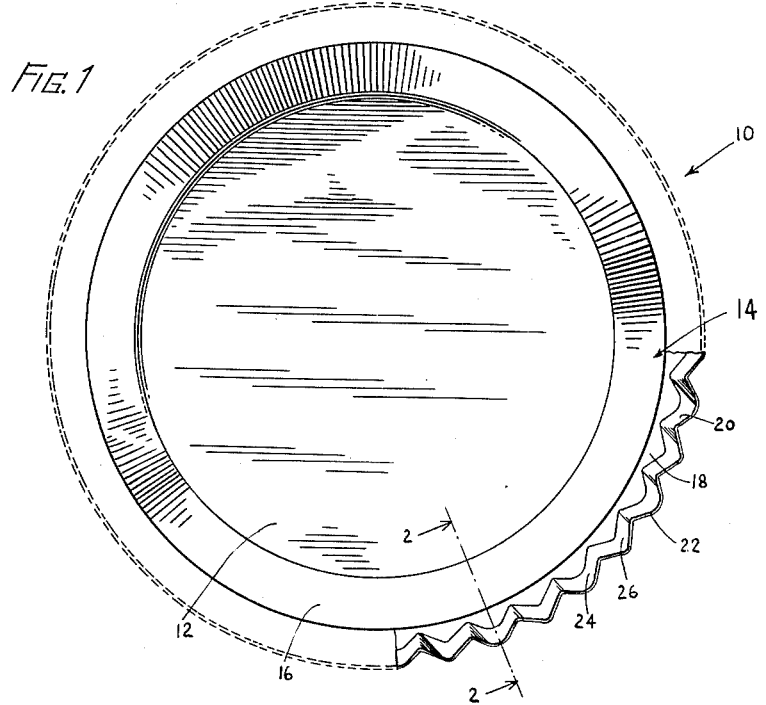
Fig. 1 is a top plan view of a pie plate embodying the present invention.
Figure 3:
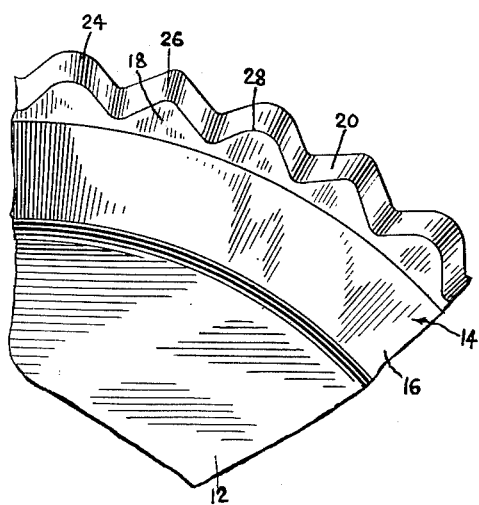
Fig. 3 is a fragmentary bottom plan view of the pie plate, on a larger scale.
Figure 2:
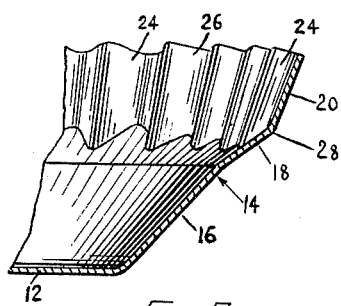
Fig. 2 is a sectional view, on a larger scale, on the line 2—2 of Fig. 1.

Reference now being had to the drawing in detail, the pie plate 10 embodying the present invention is made of any suitable sheet metal conventionally utilized in making pie plates for baking purposes. Said plate comprises a bottom 12 and a peripheral side wall 14 upstanding from said bottom and flaring outwardly thereof in integral relation therewith, said wall extending completely around said bottom of the plate. Wall 14 consists of a part 16 which is of a depth which is preferably substantially the same as the depth of the ordinary pie plate, a peripheral ledge-forming part 18, which is bent outwardly and upwardly of part 16, for supporting the rim or edge of the pie crust, and a peripheral or rim part 20 bent outwardly and upwardly from ledge-forming part 18 at the outer edge of the latter completely therearound. Thus, in the preferred form of the pie plate construction of the present invention, as herein shown, the side wall 14 of the plate flares outwardly from the bottom 12 for the full depth of said wall, that is, from the inner surface of said bottom to the upper edge 22 of side wall 14 and in addition includes, as stated, a part 18 which constitutes a support for the rim or edge of the pie crust.

It will be noted that all of the parts of plate 10 are in integral relation, side wall 14 being integral with bottom 12 and the several parts of the side wall being integral with each other. The pie plate of this construction is preferably formed from a circular sheet metal disk by die-shaping the same into the form illustrated and described. It will be observed that peripheral rim 20 has inwardly folded portions to provide flutes 24 and 26, said flutes having alternately curved and angular shaped walls, respectively, said angular shaped walls being provided in conjunction with said curved walls to obtain a fluted rim of the desired appearance consistent with the quantity of metal available for forming flutes in said rim. If desired, however, said rim 20 can have all of the flutes thereof of angular formation. Said flutes extend for the full depth of the rim 20 and are coincident at their lower edges with the outer peripheral edge 28 of ledge-forming part 18 whereby the outer edge of said ledge is scalloped. It will be understood, therefore, that the edge of the pie will conform to the shape of rim 20 completely around the pie and that the pie dough and filling will be confined by said rim and thereby prevented from overflowing.

While I have shown and described the preferred embodiment of the invention, certain changes in the details of construction and in the form or shape of the parts may be made. Thus, for example, while the upwardly flaring ledge-forming part 18 is preferred, it is within the scope of the present invention to form said ledge-forming part so that it lies in a plane substantially parallel to the plane of bottom 12 of the plate. Also the shape of the flutes in the rim forming part 20 can be varied from the specific shape herein illustrated. Accordingly, as these and other changes may be made in the pie plate of the present invention without departing substantially from the objects thereof, I do not wish to be limited to the construction herein shown or described, except to the extent which may be required by the scope of the appended claims.

Having thus described my invention, what I claim and desire to secure by Letters Patent is:

1. A pie plate or other dish comprising a bottom, and a peripheral side wall upstanding from said bottom and flaring outwardly thereof, said side wall having an integral peripheral ledge portion projecting outwardly and upwardly thereof completely therearound above said bottom, and an integral rim bent upwardly from said ledge portion at the outer edge thereof and extending completely therearound, said rim part having vertically disposed flutes therein extending for the full depth thereof whereby the outer peripheral edge of the upper surface of said ledge is scalloped.

2. A pie plate or other dish comprising a bottom, and a peripheral side wall bent upwardly from said bottom and flaring outwardly thereof, said side wall having an outwardly bent part forming a peripheral ledge, for supporting the rim of the pie crust, the inner surface of said ledge having an outer scalloped peripheral edge, and a rim part bent upwardly from said ledge in outwardly flaring relation thereto at the outer edge thereof and extending completely therearound, said rim part having vertically disposed flutes therein extending upwardly from said scalloped edge of said ledge.

3. A pie plate or other dish comprising a bottom, and a peripheral side wall upstanding from said bottom and flaring outwardly thereof, said side wall having a peripheral ledge portion projecting outwardly and upwardly thereof completely therearound above said bottom, the inner surface of said ledge having an outer scalloped peripheral edge, and a rim bent upwardly from said ledge portion at the outer edge thereof and extending completely therearound, said rim part having vertically disposed flutes therein, extending upwardly from said scalloped edge of said ledge, the outer edge of said ledge being defined by the lower end of said flutes of the rim.

4. A pie plate or other dish comprising a bottom, and a peripheral side wall upstanding from said bottom and flaring outwardly thereof, said side wall having a peripheral ledge portion projecting outwardly and upwardly thereof completely therearound above said bottom, the inner surface of said ledge having a scalloped peripheral edge, and a rim bent upwardly from said ledge portion in outwardly flaring relation thereto at the outer edge thereof and extending completely therearound, said rim part having vertically disposed flutes therein, the outer edge of said ledge being defined by the lower end of said flutes of the rim.

5. A pie plate or other dish comprising a bottom, and a peripheral side wall upstanding from said bottom and flaring outwardly thereof, said side wall having a peripheral ledge portion projecting outwardly thereof completely therearound above said bottom, and a rim bent upwardly from said ledge portion at the outer edge thereof and extending completely therearound, said rim part having vertically disposed flutes therein extending upwardly for the full depth thereof from said ledge.

6. A pie plate or other dish comprising a bottom, and a peripheral side wall upstanding from said bottom and flaring outwardly thereof, said side wall having a peripheral ledge portion projecting outwardly thereof completely therearound above said bottom, and a rim bent upwardly from said ledge portion at the outer edge thereof and extending completely therearound, said rim part having vertically disposed flutes therein, alternate flutes being curved and separated by outwardly converging angular walls forming intermediate flutes.

7. A pie plate or other dish comprising a bottom, and a peripheral side wall upstanding from said bottom and flaring outwardly thereof, said side wall having a peripheral ledge portion projecting outwardly thereof completely therearound above said bottom, and a rim bent upwardly from said ledge portion in outwardly flaring relation thereto at the outer edge thereof and extending completely therearound, said rim part having vertically disposed flutes therein extending upwardly, for the full depth thereof, from said ledge the outer edge of the inner surface of said ledge being defined by the lower end of said flutes of the rim.

GEORGE H. BROWN.